July 20, 1948.  H. D. STEVENS  2,445,728
TIRE BUILDING APPARATUS (PLY TURN-UP)
Original Filed July 17, 1940  3 Sheets—Sheet 1
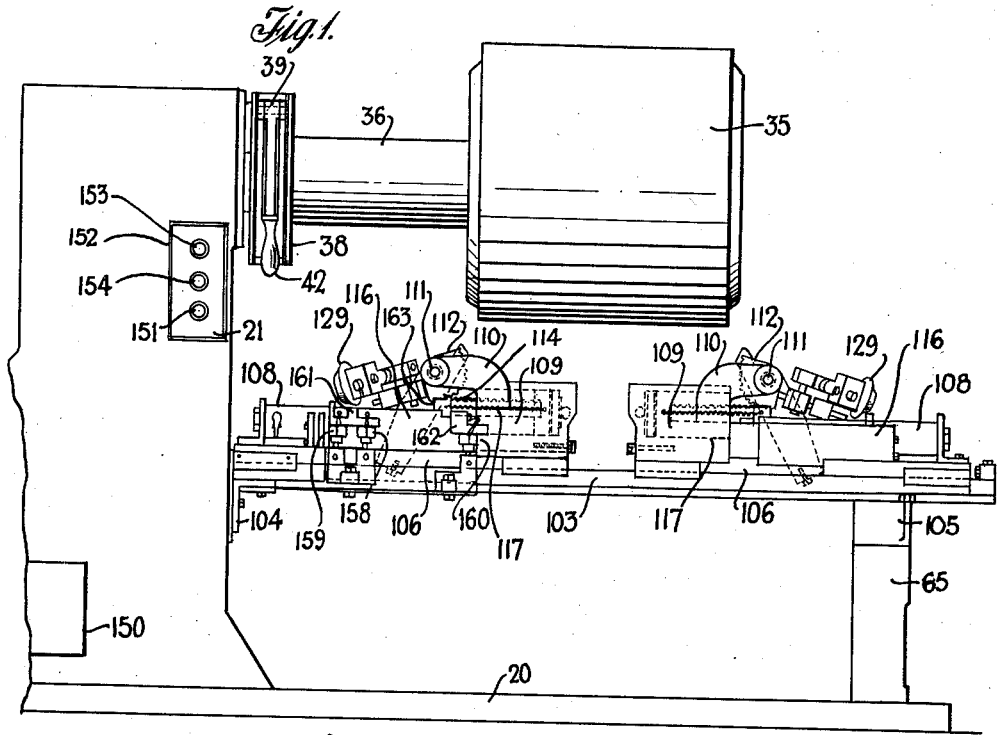
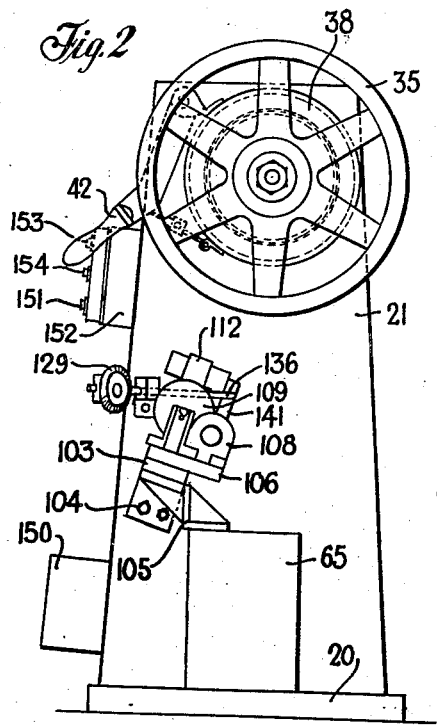
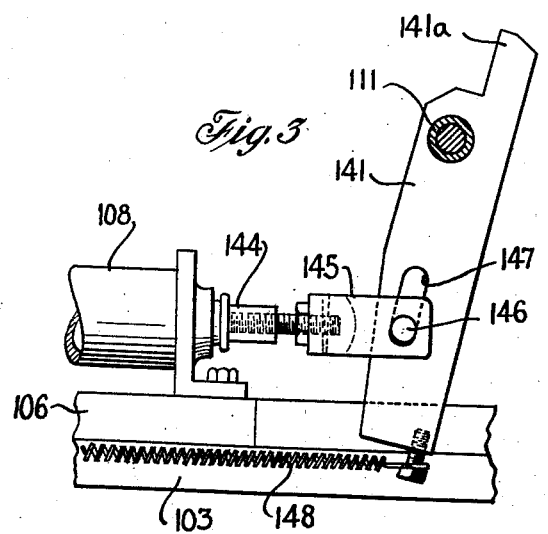
INVENTOR
HORACE D. STEVENS
BY
Ely & Frye
ATTORNEYS July 20, 1948. H. D. STEVENS 2,445,728
TIRE BUILDING APPARATUS (PLY TURN-UP)
Original Filed July 17, 1940 3 Sheets-Sheet 2
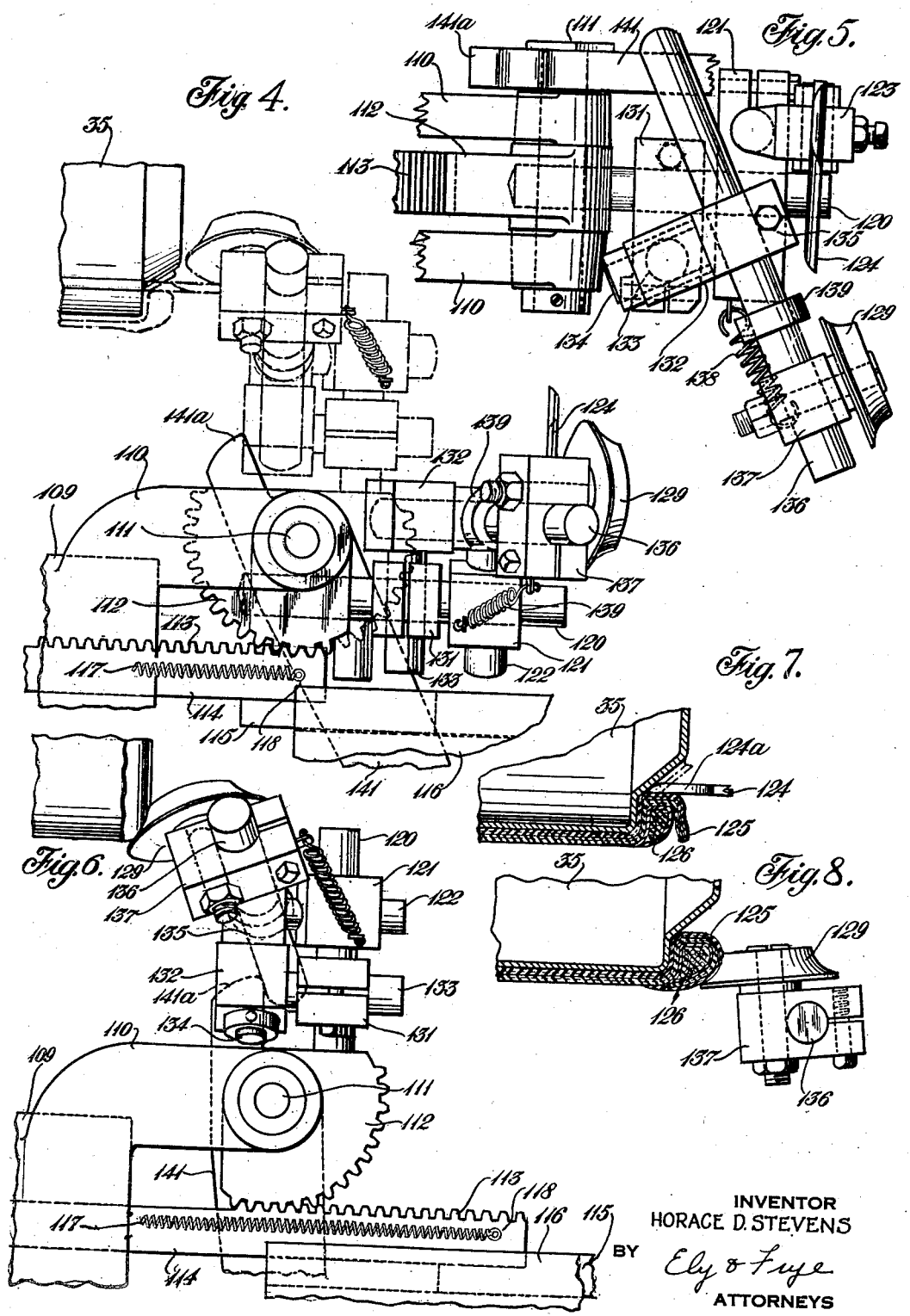
INVENTOR
HORACE D. STEVENS
BY Ely & Frye
ATTORNEYS

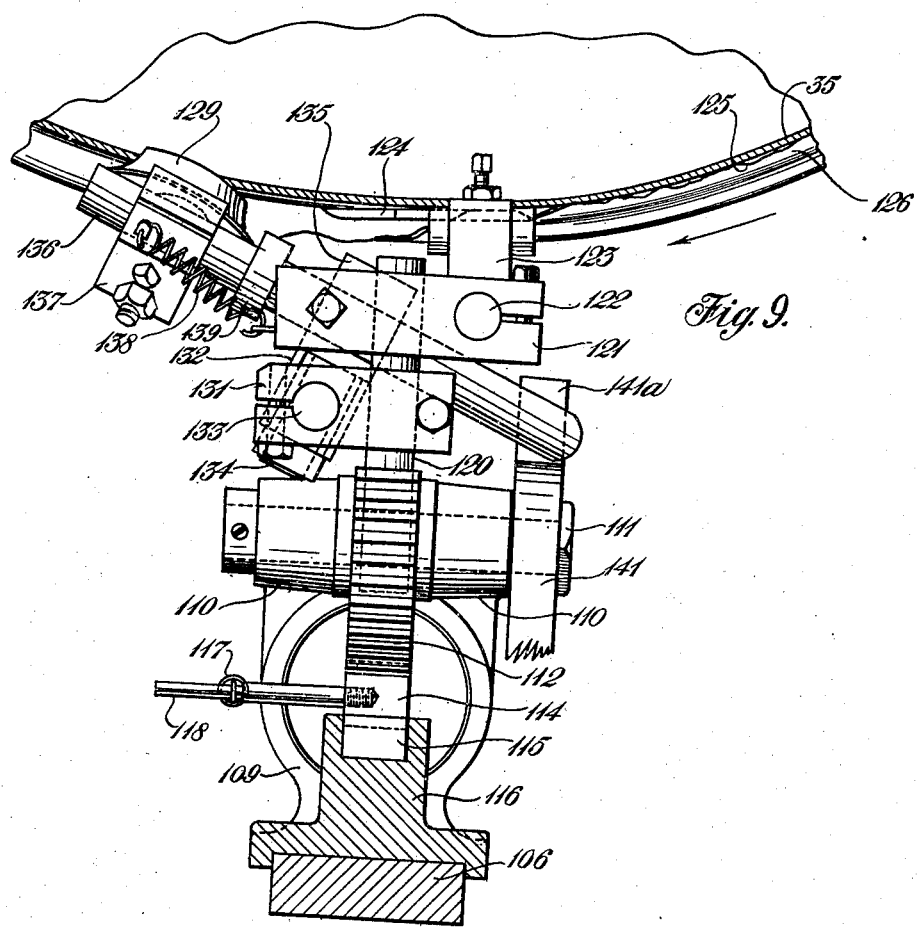
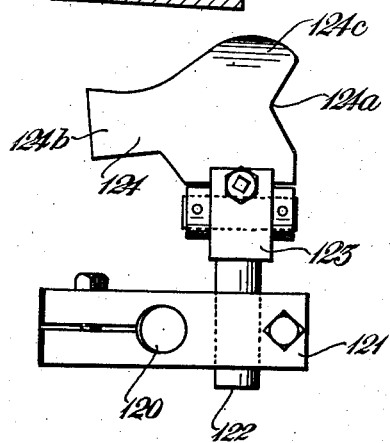

Patented July 20, 1948

2,445,728

UNITED STATES PATENT OFFICE 2,445,728

TIRE BUILDING APPARATUS (PLY TURNUP)

Horace D. Stevens, Akron, Ohio, assignor to The Firestone Tire & Rubber Company, Akron, Ohio, a corporation of Ohio Original application July 17, 1940, Serial No. 345,974. Divided and this application September 8, 1944, Serial No. 553,257

8 Claims. (Cl. 154—10.71)

This invention relates generally to tire building apparatus for the fabricating of pneumatic tire casings, and more especially it relates to ply turn-up devices for turning under-bead fabric plies outwardly around the bead-cores during the fabricating of tires.

The chief objects of the invention are to effect the turning up of the under-bead fabric plies of a tire under construction in a superior and more expeditious manner than heretofore has been possible; and to save time and labor in the manufacture of pneumatic tire casings. Other objects will be manifest as the description proceeds.

This application is a division of my prior application, Serial Number 345,974, filed July 17, 1940, now Patent No. 2,381,379, dated August 7, 1945.

Of the accompanying drawings:

Fig. 1 is a front elevation of tire building apparatus embodying the invention;

Fig. 2 is an end elevation as viewed from the right thereof;

Fig. 3 is a fragmentary detail elevation, on a larger scale, of one of the fluid pressure cylinders of the apparatus, as viewed from the rear thereof;

Fig. 4 is a front elevation, on a larger scale, of one of the devices that turn the under-bead fabric plies around the bead-cores after the latter have been applied to the drum, the device being shown in inoperative position in full lines, and in its initial operative position in broken lines;

Fig. 5 is a plan view of the device shown in Fig. 4 in its inoperative position;

Fig. 6 is a front elevation of the device shown in Fig. 4 in its final operative position;

Fig. 7 is a detail sectional view showing the action of one of the ply turn-up tools on the work;

Fig. 8 is a detail sectional view showing the action of another ply turn-up tool on the work;

Fig. 9 is a side elevation of a ply turn-up device, in operative position, as viewed from the right of Fig. 1; and Fig. 10 is a plan view of the turn-up tool shown in Fig. 7, and its holder.

Referring now to the drawings, especially Figs. 1 and 2 thereof, there is shown a bed plate 20 at one side of which is mounted an upright housing 21. Projecting laterally from the housing is a mechanism (not shown), that supports and drives an annular collapsible tire building form or drum 35, that has the usual shoulders at its opposite ends. Said form or drum is of a standard construction well known to the trade, so that it is not believed necessary to show and describe herein the details of the mechanism that effects collapse thereof other than to say that collapsing of the drum, and the subsequent restoration thereof to annular shape, is effected by means of relative angular movement between the drum-driving means and a tubular sleeve 36 that encloses the latter. The outer end of said sleeve 36 extends into the drum 35 and is operatively connected to the collapsing mechanism thereof by suitable means (not shown). The opposite end of the sleeve 36 is formed with an integral brake drum 38 that is embraced by a brake band 39, a brake lever 42 being provided for engaging the brake band with the brake drum. The arrangement is such that when the brake band is tightened about the brake drum, if the latter is being rotated in the direction that it normally rotates during the building of a tire, relative rotative movement of the sleeve 36 and the building drum 35 will effect collapse of the latter. When it is desired to expand the collapsed drum, the latter is rotated in the opposite direction and the brake thereafter again applied, as is well understood in the art.

In the building of a tire upon the drum 35, the first step is the application of two plies of tire building fabric to the drum, which plies commonly are called "under-bead" plies. The next step is the rolling down or stitching of the lateral marginal portions of said plies so that they conform to the shoulders or reduced portions of the drum at opposite ends thereof. The mechanism for stitching down said plies is not a part of the present invention, so it need not be shown or described herein. After the first two fabric plies have been applied to the drum and stitched down as aforementioned, the usual tire bead cores are mounted upon the shoulders of the drum by any known or preferred bead-setting devices (not shown), which constitute no part of the present invention. It is next required that the marginal portions of the under-bead fabric plies be turned up about the bead cores, and it is to improved apparatus for performing this operation that this invention is directed.

Referring first to Fig. 1 of the drawings, there is shown a supporting structure for a pair of ply turn-up devices, which structure consists of a relatively narrow and elongate beam 103 that rests at one end upon an angle 104 secured to the housing 21, and at its other end rests upon a bracket 105 mounted atop of a larger standard or bracket 65. Mounted on the top side of beam 103, at opposite ends thereof, are respective slide bars 106, 106, which slide bars are somewhat wider than the beam 103 at their ends that are nearest the ends of the beam. Each of said slide bars supports one of the ply turn-up devices, the latter being identical in construction and operation, and located at opposite sides of the central plane of the drum 35. The slide bars are adjustable longitudinally of the beam 103 for the purpose of positioning the ply turn-up tools accurately with relation to the opposite ends of the drum 35.

Each of the slide bars 106, at its end farthest from the other slide bar, has a single-acting fluid pressure cylinder 108 mounted thereon, and at its other end has a fluid pressure cylinder 109, the axes of said cylinders being horizontally disposed, but offset laterally from each other. The cylinders 109 are arranged with their closed ends confronting each other, and with piston rods projecting from their opposite ends. Each cylinder 109 is formed, at its end from which its piston rod projects, with a pair of upwardly and axially extending arms 110, 110 in the free ends of which is journaled a pivot pin 111, and mounted upon the latter between said arms is a gear segment 112 that is meshed with rack teeth 113 formed on the upper face of a square piston rod 114 of the cylinder 109. The outer end of the rod 114 is provided with an extension 115 that moves in a slideway formed in a piston rod support 116 that is mounted on slide bar 106. The arrangement is such that when the cylinder 109 is charged, the piston rod 114 thereof is projected outwardly, thereby turning the gear segment 112 angularly from the position shown in full lines in Figs. 4 and 5 to the position shown in broken lines in Fig. 4 and in full lines in Fig. 6. When the cylinder 109 is discharged, the piston rod 114 is retracted by means of a tension spring 117 that is connected at one of its ends to a fixed point on the cylinder 109 and at its other end to a stud 118 that projects laterally from the piston rod near the outer end thereof. It is the gear segments 112 that carry the work-engaging tools of the ply turn-up devices.

To this end one of the radial margins of each segment 112 has a supporting pin or arm 120 mounted therein and disposed perpendicular to said margin, the latter being disposed in vertical position in the inoperative position of the device as shown in full lines in Fig. 4 and in Fig. 6. Mounted upon the supporting pin 120, near the free end thereof, is an adjusting block 121 that is adjustable axially and angularly of the pin 120, and adjustably carried by said block 121 for axial and angular adjustment thereon is the stem 122 of a tool holder 123, the latter carrying a flat, blade-like tool 124. The tool 124 has a notch 124a at one end and tail-like portion 124b at its other, there being a rounded lateral projection 124c near said notched end. The lateral projection 124c is beveled on one side of the tool and the tail portion 124b is beveled on the opposite side of the tool. The operative function of the tool 124 is best understood with reference to Figs. 7 and 9 wherein it is shown in operative relation to the drum 35 and work thereon, the latter consisting of two under-bead fabric plies 125, and a tire bead core 126 mounted upon the latter at the shoulder of the drum. The drum being rotated in the direction indicated by the arrow in Fig. 9, angular movement of the gear segment 112 swings the supporting pin 120 in such a manner as to carry the tool 124 into engagement with the drum 35, the lateral projection 124c of the tool entering between the fabric plies 125 and the sloping shoulder of the drum on which they lie, and thereby turning the marginal portions of said plies outwardly onto the adjacent face of the bead core structure 126, as is best shown in Fig. 7. As is clearly shown in Fig. 9, the tool 124 in operative position is disposed tangentially of the drum and the bead core 126, so that the marginal portion of the plies 125 turned outwardly by the projection 124c of the tool 124 are further engaged by the tail portion 124b of the tool and folded farther about the bead core 126, as the rotating drum moves the work thereon relatively of the said tool. Thus the fabric plies are in position to be engaged by a second tool of the ply turn-up device. The movement of the tool 124 toward the drum 35 initially is slow, with its final movement more rapid, so as more efficiently to engage the work on the drum, the said change in speed being effected by controlling the rate at which the cylinder 109 is charged.

The second turn-up tool is a rotatable disc or roller 129 having a grooved perimeter shaped complemental to the transverse curvature of the tire bead core 126 and adapted to complete the folding of the margins of plies 125 about said core. For this reason it is necessary that the disc 129 initially engage the work after the latter has been engaged by the tool 124, and to this end means operating subsequent to the angular movement of the gear segment 112 is provided for moving the tool 129 into engagement with the work.

For supporting the tool 129, an adjusting block 131 is mounted upon supporting pin 120 between the segment 112 and the adjusting block 121 thereon, said block 131 being axially and angularly adjustable on said pin. The adjusting block 131 supports a swivel block 132 that is provided with a stem or post 133, the latter being adjustably clamped in said block 131. The swivel block is disposed on that side of the adjusting block 131 that is nearest the drum 35 when the turn-up device is in the operative positions shown in Figs. 6 and 9, and the stem 133 of said swivel block is disposed at right angles to the pin 120. Swiveled in the swivel block 132, on an axis perpendicular to the stem 133, is the stem 134 of a clamp 135. Mounted for axial adjustment in the latter is an arm or shaft 136 that projects from both sides of said clamp and on one end thereof carries an adjustably mounted tool-block 137 upon which is swiveled the tool 129. A tension spring 138 connected at one of its ends to the tool-block 137 and at its other end to the adjusting block 121 yieldingly urges the structure carried by the swiveled clamp 135 to the inoperative positions shown in Figs. 4 and 5. Movement of the said structure under the impetus of said spring is limited by a collar 139 that is mounted upon the arm 136 and which bears against the adjusting block 121 in the inoperative position of said structure.

The arrangement is such that the structure mounted on the swivel block 132 is moved from the position shown in full lines in Fig. 4 to the position shown in broken lines therein by the angular movement of gear segment 112, when moved counterclockwise as viewed in said figure, which movement carries the rotary tool 129 to a position in laterally spaced relation to the end of the drum and the tire bead being built thereon. For subsequently moving the said tool into operative engagement with the tire bead, to press down the marginal portions of the fabric plies 125 thereon, a lever 141 is provided, which lever is pivotally mounted intermediate its ends upon the pivot pin 111, beside the rear supporting arm 110 of the latter. The upper end of the lever 141 is formed with a nose portion 141a, which normally is in the inoperative position shown in Figs. 4 and 5, and is disposed in spaced relation to the shaft 136, at the end thereof remote from the tool 129, in both positions of the pin shown in Fig. 4. The lever 141 is angularly movable upon its pivot, and when so moved the nose portion 141a thereof engages the adjacent end of the shaft 136 and moves the latter and the structures carried thereby angularly about the pivot consisting of the stem 134, with the result that the tool 129 is moved, against the tension of spring 136, into engagement with the bead portion of the work, as is shown in Figs. 6 and 9. In Fig. 8 the function of the tool 129 in rolling down the marginal portions of the under-bead plies 125 upon the bead core 126 is clearly shown.

The moving of the lever 141 as described is effected by the fluid pressure cylinder 108, and to this end the piston rod 144 thereof (Fig. 3) has a clevis 145 adjustably affixed in its outer end, said clevis embracing the lever 141, below the pivot 111 thereof, and carrying a pin 146 that extends through a slot 147 disposed longitudinally in said lever. The arrangement is such that when the cylinder 108 is charged, its piston rod 144 is projected and swings the lever 141 angularly to operate the turn-up tool 129 as previously described. Upon discharge of the cylinder 108 retraction of its piston rod and the lever 141 is effected by means of a tension spring 148 that is connected at one end to the lower end of said lever and at its other end is connected to a fixed point (not shown) on the slide bar 106. Means by which the cylinder 108 is operated in determinate time relation to the operation of the cylinder 109 presently will be described.

The ply turn-up devices may be and preferably are operated automatically in determinate sequence with other mechanisms (not shown) of this apparatus, and to this end a suitable controller or timing device is provided, which device is located in the casing 150 mounted upon the front of the housing 21. Said controller may be of any standard or preferred construction, no novelty being claimed for it so that no detail description thereof need be given here. The said controller is electrically operated, and is set in operation by means of a switch button 151 on a switch box 152 that also is located on the front of housing 21. The switch box 152 also includes "forward" and "reverse" buttons 153, 154 that control the direction of rotation of the drum 35.

The primary control of cylinders 109 is in the switch mechanism mentioned, but the control of the speed of admission of fluid thereto, and the control of the fluid pressure cylinders 108 is effected by other means under control of cylinder 109. To this end suitable toggle valves are mounted in the pipes that conduct fluid to said cylinders, which valves are operated in proper sequence by the movement of piston rod 114 of one of the cylinders 109, it being understood that both cylinders 108 and cylinders 109 are connected to supply pipes common to each pair of cylinders. The aforesaid valves are shown in Fig. 1 wherein 158 designates a pilot valve in a high pressure fluid supply line connecting with cylinders 109, 159 designates a valve in the fluid supply line common to cylinders 108, and 160 designates an exhaust valve in the supply line of the cylinders 108. The operating toggle levers of valves 158, 159 are engaged by an operating block 161 that is slidably mounted for movement atop of the valves, the toggle levers extending through slots in said block and being so arranged therein as to operate in sequence when said block is moved. Thus when the block 161 is moved to the left as viewed in Fig. 1, the lever of valve 158 first is operated, followed by valve 159, the arrangement providing delayed action of the latter. A somewhat similar operating block 162 is mounted atop of valve 160 in engagement with the toggle lever thereof. The blocks 161, 162 are moved to effect operation of the respective valves by means of the piston rod 114 of the cylinder 109 at the left of the apparatus as viewed in Fig. 1, and to this end the stud 118, to which the spring 117 is connected, carries a block 163 that is disposed between the operating blocks 161, 162 and in alignment therewith. When the apparatus is in the inoperative position shown in Fig. 1, the block 163 is in engagement with block 162 and the latter holds the valve 160 open so that cylinder 108 is in evacuated condition, the piston rod 144 of the cylinder being in retracted position under the force of tension spring 148. When the cylinders 109 are charged through the agency of the timing device, low pressure fluid admitted to them slowly moves their piston rods 114 outwardly, the first result being that block 163 moves away from block 162 and permits valve 160 to close the discharge port of cylinder 108. Subsequently block 163 engages block 161 and moves it to the left as viewed in Fig. 1, the first result being to operate and open valve 158 and thereby admit fluid under high pressure to cylinder 109 so as quickly and strongly to move the piston rod thereof to fully projected position. The opening of valve 159 by the block 161 is slightly delayed following the opening of valve 158. Opening of valve 159 admits fluid pressure to cylinders 108 to project the piston rods thereof and effect the operations previously described. After a determinate time interval the timer releases the pressure in cylinders 109, and the springs 117 thereof retract their piston rods 114, with the result that the block 163 thereon is restored to point of starting. This moves said block against block 162 to open valve 160 and thereby to evacuate cylinders 108, the springs 148 thereof returning their piston rods to retracted position.

From the foregoing it will be apparent that the ply turn-up device of the invention is automatic in its operation, that it saves time and labor in the manufacture of pneumatic tire casings, and achieves the other advantages set out in the foregoing statement of objects.

Modification may be resorted to without departing from the spirit of the invention or the scope thereof as defined by the appended claims.

What is claimed is:

1. Tire building apparatus comprising a rotatable tire building drum, and a pair of concurrently operable devices adapted to operate upon the work on opposite ends of said drum, each of said devices comprising a pair of tools for operating upon the work, power means for moving both said tools in the direction of the work to determinate positions wherein only one of the tools engages the work, and a second power means for imparting movement solely to the other of said tools so as to cause it to engage the work after the first tool has engaged the same.

2. Tire building apparatus comprising a rotatable drum, and a ply turn-up device adapted to operate upon a tire structure on the drum at one end thereof, said device comprising a non-rotatable folding tool, a rotatable pressing tool, means for moving said tools in unison to carry the non-rotatable tool into engagement with the work, and subsequently operating means for moving the rotatable tool relatively of the non-rotatable tool and into engagement with the work.

3. Tire building apparatus comprising a rotatable drum, and a ply turn-up device adapted to operate upon a tire structure on the drum at one end thereof, said device comprising a pair of tools for operating upon the work, a supporting structure upon which said tools are independently mounted, means for moving said supporting structure as a whole to a determinate ultimate operative position with relation to the work in which position one of said tools engages the latter, and means for subsequently moving the other tool into engagement with the work while said supporting structure is stationary.

4. Tire building apparatus comprising a rotatable drum, and a ply turn-up device adapted to operate upon a tire structure on the drum at one end thereof, said device comprising a pair of tools for operating upon the work, a pivotally mounted supporting structure upon which one of said tools is mounted, a support for the second tool carried by said first-mentioned support and movable relatively thereof, means for moving said supports in unison to carry one of said tools into engagement with the work, and means subsequently moving the support of the second tool to carry the latter into engagement with the work while the first-mentioned support is stationary.

5. Tire building apparatus comprising a rotatable drum, and a ply turn-up device adapted to operate upon a tire structure on the drum at one end thereof, said device comprising a pair of tools for operating upon the work, a pivotally mounted supporting structure upon which one of said tools is mounted, a support for the second tool pivotally mounted upon the first-mentioned support, and means for moving said supports angularly upon their pivots in sequence to carry said tools into engagement with the work in succession, the means moving the second support operating independently of the first-mentioned support after movement of the latter has ceased.

6. Tire building apparatus comprising a rotatable drum, and a ply turn-up device adapted to operate upon a tire structure on the drum at one end thereof, said device comprising a pair of tools for operating upon the work, a pivotally mounted supporting structure upon which one of said tools is mounted, a support for the second tool pivotally mounted upon the first mentioned support, means for moving the latter angularly about its pivot to carry one tool into engagement with the work and to carry the support for the second tool to a determinate position, and power operated means at said position for engaging and moving the support for the second tool about its own pivot after the first-mentioned support has reached ultimate operative position and its movement has ceased.

7. Tire building apparatus comprising a rotatable drum, and a ply turn-up device adapted to operate upon a tire structure on the drum, said device comprising a pair of tools for operating upon the work, a movable supporting structure upon which one of said tools is mounted, power means for moving said supporting structure between operative and inoperative positions, a support for the second tool mounted upon the first mentioned support and movable relatively thereof, power means operable upon the second tool support after the first tool support is stationary in its ultimate operative position, to move said second tool support to operative position, and means controlled by the operation of the first mentioned power means for subsequently effecting operation of the second power means.

8. Tire building apparatus comprising a rotatable drum, and a ply turn-up device adapted to operate upon a tire structure on the drum, said device comprising a pair of tools for operating upon said tire structure, a movable supporting structure upon which one of said tools is mounted, power means for moving said supporting structure between operative and inoperative positions, a support for a second tool pivotally mounted upon the first mentioned supporting structure and movable relatively thereof, power means operable upon the second tool support after the first tool support is stationary in its ultimate operative position, to move said second tool support to operative position, said power means comprising an angularly movable lever having a projecting nose portion that engages the second tool support, and means operating said lever, and means controlled by the operation of the first mentioned power means for subsequently effecting operation of the second power means.

HORACE D. STEVENS.

REFERENCES CITED

The following references are of record in the file of this patent:

UNITED STATES PATENTS

| Number | Name | Date |
|---|---|---|
| 1,603,988 | Scrote | Oct. 19, 1926 |
| 1,970,780 | Stevens | Aug. 21, 1934 |
| 2,316,369 | Shook | Apr. 13, 1943 |
| 2,339,551 | Stevens | Jan. 18, 1944 |